(12) United States Patent
Schwarz

(10) Patent No.: US 6,565,395 B1
(45) Date of Patent: May 20, 2003

(54) ELECTRICAL CONNECTION TO A COIL SPRING THROUGH A LOCAL INTERFERENCE FIT FOR CONNECTION TO A VIBRATORY ROTATION SENSOR AND METHOD OF FORMING THE SAME

(75) Inventor: Robert Schwarz, Santa Barbara, CA (US)

(73) Assignee: Northrop Grumman Corporation, Woodland Hills, CA (US)

( * ) Notice: Subject to any disclaimer, the term of this patent is extended or adjusted under 35 U.S.C. 154(b) by 0 days.

(21) Appl. No.: 10/027,688

(22) Filed: Dec. 21, 2001

(51) Int. Cl.[7] ................................................ H01R 13/33
(52) U.S. Cl. ........................ 439/840; 439/816; 439/824
(58) Field of Search ......................... 439/700, 66, 824, 439/817, 840, 816

(56) References Cited

U.S. PATENT DOCUMENTS

| | | | | | |
|---|---|---|---|---|---|
| 5,328,391 A | * | 7/1994 | Soshi et al. | ................. | 439/824 |
| 5,600,199 A | * | 2/1997 | Martin, Sr. et al. | ......... | 439/700 |
| 6,159,056 A | * | 12/2000 | Boyle | ......................... | 439/700 |
| 6,174,174 B1 | * | 1/2001 | Suzuki et al. | ................. | 439/66 |
| 6,193,524 B1 | * | 2/2001 | Chang | .......................... | 439/66 |
| 6,280,258 B1 | * | 8/2001 | Frohlund | ..................... | 439/700 |
| 6,341,962 B1 | * | 1/2002 | Sinclair | ....................... | 439/66 |
| 6,447,343 B1 | * | 9/2002 | Zhang et al. | ................ | 439/824 |
| 6,464,511 B1 | * | 10/2002 | Watanabe et al. | ........... | 439/700 |

\* cited by examiner

*Primary Examiner*—Gary Paumen

(57) ABSTRACT

An electrical connection between a vibratory rotation sensor and a hermetic header which makes use of a local interference fit to provide a high degree of mechanical isolation between the sensor and the header. The electrical connection includes an electrical pin extending from the header which is connected to the sensor through a coil spring. The pin includes an enlarged portion having a maximal dimension greater than an inner diameter of the coil spring to provide an interference fit between the coil spring and the pin. The degree of interference is variable controlled by selecting the dimensions of the enlarged portion of the pin and the coil spring. The degree of mechanical isolation between the header and sensor can also be chosen by selecting the location of the enlarged portion along a length of the pin. This provides a reliable electrical connection which maintains a high degree of mechanical isolation.

38 Claims, 4 Drawing Sheets

ELECTRICAL CONNECTION TO A COIL SPRING THROUGH A LOCAL INTERFERENCE FIT FOR CONNECTION TO A VIBRATORY ROTATION SENSOR AND METHOD OF FORMING THE SAME

BACKGROUND OF THE INVENTION

1. Field of the Invention

This invention relates to a class of vibratory rotation sensor in which the vibrating member is a thin-walled hemispherical shell, and more specifically relates to the electrical connections for such a sensor.

2. Description of Related Art

A conventional vibratory rotation sensor 10 is illustrated in FIG. 1 in an exploded view, as having an outer member 12, a hemispherical resonator 14, and an inner member 16, all of which are made of fused quartz and are joined together with indium. This particular type of vibratory rotation sensor, which has a vibrating member 14 that is a thin-walled axi-symmetric hemispherical shell, is known as a hemispherical resonator gyro (HRG).

The inertially sensitive element in the HRG 10 is the hemispherical resonator 14, usually a thin-walled, bell-shaped object positioned between an outer member 12 and an inner member 16 and supported between the inner and outer members by a stem 26. The thin-walled axi-symmetric hemispherical shell 14 oscillates in one of its lower-order flexing modes. The shell resonator flexing mode takes the form of an elliptical standing wave.

The elliptical standing wave contains four anti-nodes and four nodes, the anti-nodes and nodes being separated from one another by 45 degrees. The rotation sensitivity of the standing wave results from the fact that each mass element of the shell undergoing oscillation acts much like a Foucault pendulum attempting to keep the direction of its linear momentum fixed in inertial space when the shell rotates about its axis. The resulting Coriolis forces, the product of the shell's vibratory motion, and the inertial input rate, cause the standing wave to precess with respect to the shell. The standing wave precession angle is known as the gain of the gyro.

In operation, forces are required to control the standing wave on the hemispherical shell resonator 14. These forces are quasi-electrostatic in nature. In the case of the HRG 10 in FIG. 1, a number of electrodes 22 are metallized on the inside surface 20 of the outer housing 12, which is concentric with the hemispherical shell resonator 14. The outer surface of the shell resonator 14 is metallized so that when the device is assembled, the electrodes in the outer housing 12, together with the surface of the resonator they face, form a series of forcing electrostatic capacitors. Voltages applied to the appropriate combinations of these electrodes control the amplitude of the standing wave and also act to suppress unwanted quadrature effects.

Rotation of the HRG 10 about an axis normal to the plane of the rim 34 of shell resonator 14 causes the standing wave to rotate in the opposite direction with respect to the HRG 10 by an angle proportional to the angle of rotation of the HRG 10. Thus, by measuring the angle of rotation of the standing wave with respect to the HRG 10, one can determine the angle of rotation of the HRG 10. The vibrational mode of the shell resonator 14 is excited by placing a DC bias voltage on the resonator and an AC voltage on the forcing electrodes 22. The frequency of the AC voltage is usually about twice the resonant frequency of the hemispherical shell resonator 14.

Readout signals from the HRG 10 containing information about the amplitude and location of the standing waves on the shell resonator 14 are also obtained capacitively. The capacitive readout electrodes 24 are formed proximate to a metallized interior surface 30 of the shell resonator 14, where a plurality of electrodes 24 which are located on an inner concentric quartz housing held in close proximity to the inner metallized shell resonator 14. Because of the shell's oscillating deformation, the capacitance of each of the electrodes 24 is modulated at the resonator flexing frequency. An electronic readout circuit measures these capacitance changes and hence the location and amplitude of the standing wave is determined.

This HRG construction is inherently highly reliable. Its internal electronics consist solely of passive capacitive electrodes sealed in a vacuum. The capacitive electrodes are formed from metallized quartz and a vacuum dielectric between the metallized electrode surfaces, and hence are extremely reliable. Additional and more specific details of vibratory rotation sensors can be found in U.S. Pat. No. 4,951,508 issued to Loper, Jr. et al. Aug. 28, 1990, the entire disclosure of which being incorporated herein.

There are situations where it is desirable to isolate and protect the HRG from external elements. In these situations, it is sometimes necessary to place a hermetic header around the gyroscope to seal out the external elements. In order to obtain the measurements from the capacitive electrodes in the gyroscope, an electrical connection must be established through the hermetic header to the circuits in the gyroscope. It is critical that this electrical connection provides a high degree of mechanical isolation between the gyroscope and the hermetic header, so that this connection does not hinder or restrain the vibrational movement of the gyroscope. Without maintaining such mechanical isolation, the accuracy of the gyroscope measurements can be significantly diminished.

SUMMARY OF THE INVENTION

The present invention provides an electrical connection between a vibratory rotation sensor and a hermetic header, wherein the electrical connection maintains a high degree of mechanical isolation between the sensor and the header. The electrical connection includes an electrical pin which is connected to an electrical contact pad on the sensor through a coil spring in order to provide an electrical path for readout information from the sensor. The electrical pin forms an interference fit with the coil spring. The electrical pin includes an enlarged portion having a maximal dimension which is greater than an inner diameter of the coil spring for providing the interference fit between the coil spring and the pin. The degree of interference between the pin and the coil spring can be variable selected by selecting the dimensions of the enlarged portion of the pin and the coil spring, such as the maximal cross-section diameter of the enlarged portion, the length of the enlarged portion, the inner diameter of the coil spring, and the spacing between the coils of the coil spring. Furthermore, by selecting the location of the enlarged portion along a length of the pin, the degree of mechanical isolation between the header and sensor can be variably selected by selecting the amount of active coil extending between the sensor and the enlarged portion of the pin. In this manner, the connection between the electrical pin and the coil spring of the present invention is designed to provide this high degree of mechanical isolation from the sensor while still providing an accurate and reliable electrical connection.

BRIEF DESCRIPTION OF THE DRAWINGS

The exact nature of this invention, as well as its objects and advantages, will be readily appreciated upon reference to the following detailed description when considered in conjunction with the accompanying drawings, in which like reference numerals designate like parts throughout the figures thereof, and wherein.

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide an electrical connection between a vibratory rotation sensor and a hermetic header.

Figure 1:
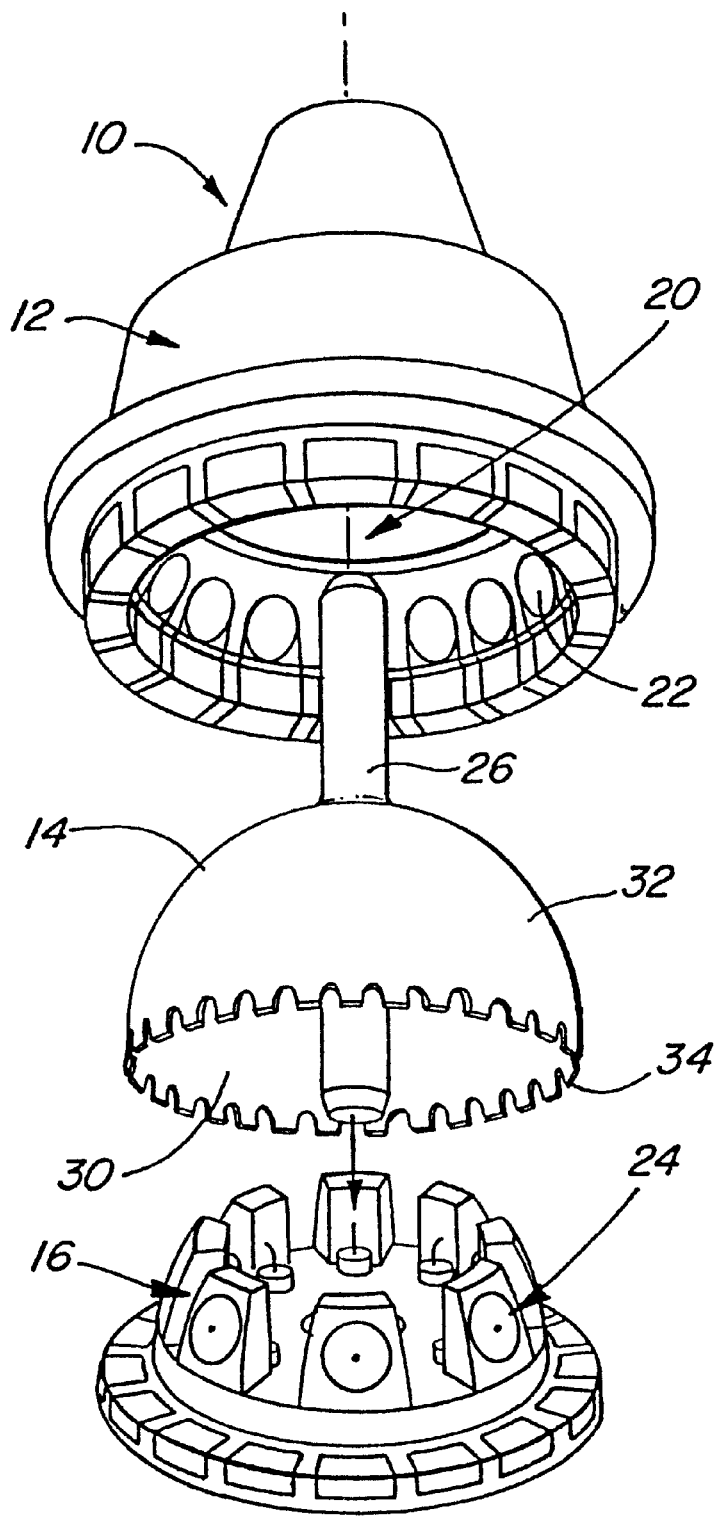
FIG. 1 is a perspective view of an exploded conventional vibratory rotation sensor.
Figure 2:
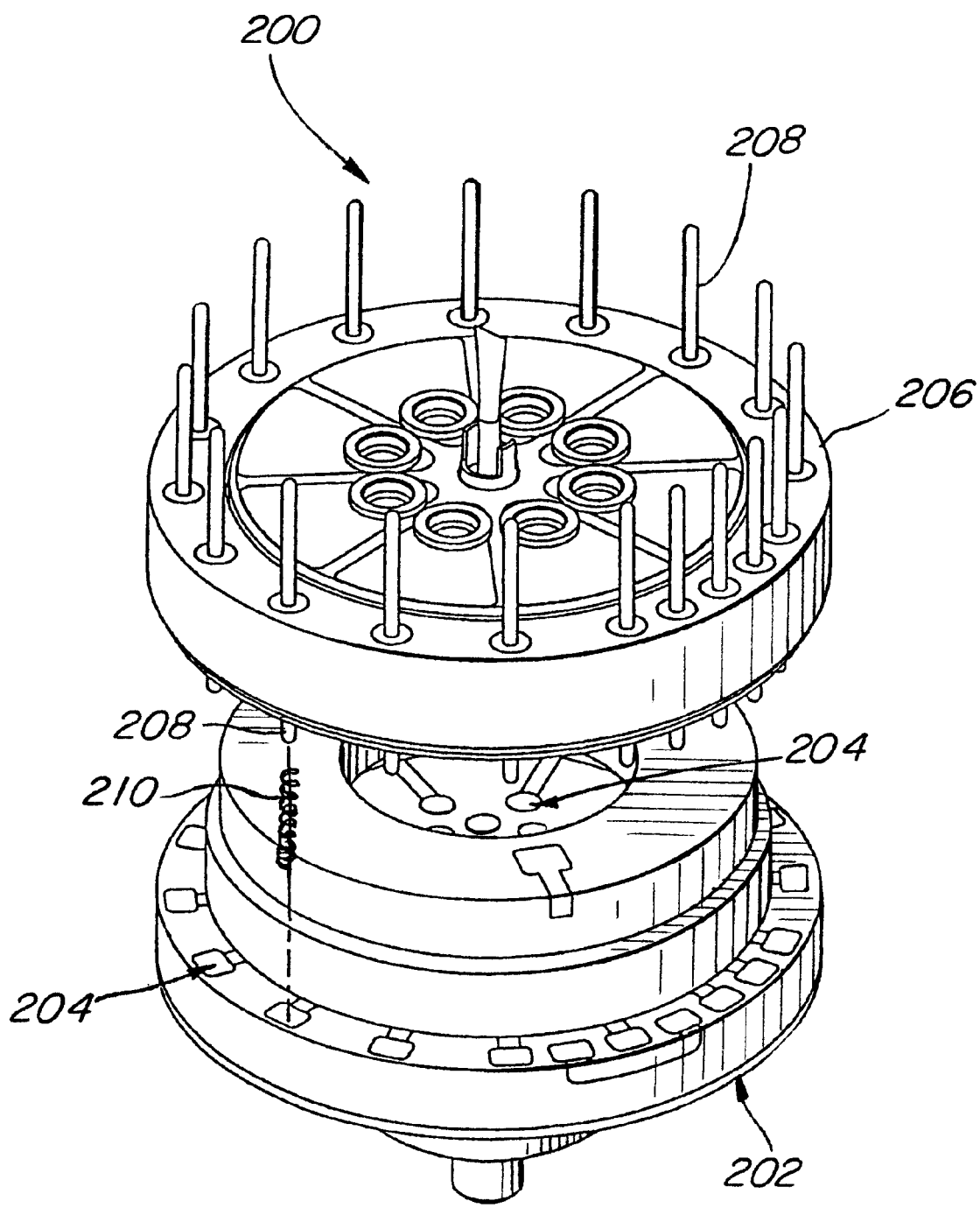
FIG. 2 is a perspective top view of an exploded vibratory rotation sensor and header assembly in accordance with a preferred embodiment of the present invention.

Referring now to FIG. 2, a perspective view of an exploded vibratory rotation sensor and header assembly 200 in accordance with a preferred embodiment of the present invention is illustrated. The assembly 200 includes a vibratory rotation sensor 202, described hereinafter as a sensor of a hemispherical resonator gyroscope (HRG) design, while it is understood that other types of vibratory rotation sensors may be utilized. The vibratory rotation sensor 202 includes a plurality of electrostatic capacitors providing information about the amplitude and location of the standing waves in the vibratory rotation sensor 202 to determine its angle of rotation. A plurality of electrical contact pads 204 located on the vibratory rotation sensor 202 are connected to the electrical circuitry associated with the electrostatic capacitors. Readout signals for movement of the vibratory rotation sensor 202 can be obtained from the electrical contact pads 204.

The assembly 200 further includes a hermetic header 206 positioned over a portion of the vibratory rotation sensor 202 to provide a hermetic seal protecting the vibratory rotation sensor 202 from external elements. The header 206 includes a plurality of electrical pins 208, where each pin 208 is connected to a respective electrical contact pad 204 through a coil spring 210 to provide an electrical path for the readout signals from the vibratory rotation sensor 202 to the header 206. Any hindrance in the movement of the vibratory rotation sensor 202 will diminish the accuracy of its measurements, thus it is imperative that a high degree of mechanical isolation be maintained between the header 206 and the vibratory rotation sensor 202. The electrical pin 208 and coil spring 210 connection of the present invention is designed to provide this high degree of mechanical isolation while still providing an accurate and reliable electrical connection.

Figure 3:
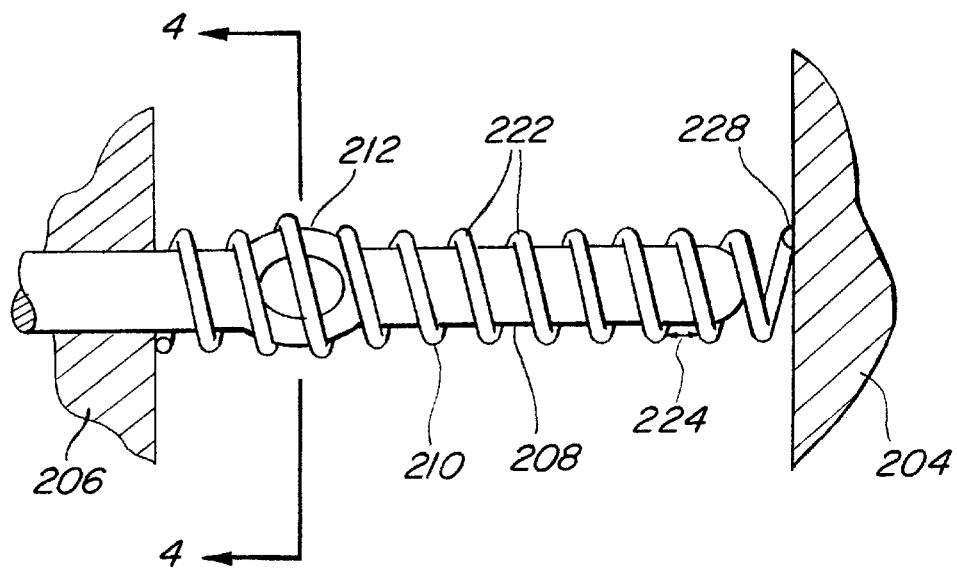
FIG. 3 is a partial cross-sectional side view of an electrical connection between a vibratory rotation sensor and a header assembly in accordance with a preferred embodiment of the present invention.
Figure 4:
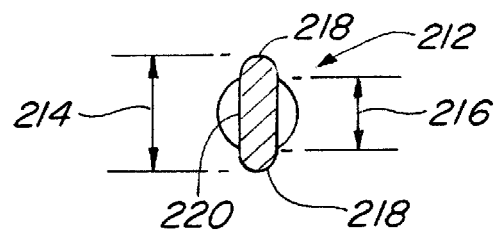
FIG. 4 is a cross-sectional view taken generally along line 4—4 of FIG. 3.

Referring now to FIG. 3, an enlarged view of the electrical pin 208 and coil spring 210 connection of a preferred embodiment of the present invention is illustrated. The pin 208 includes an enlarged portion 212 having a maximal cross-sectional diameter 214 greater than the cross-sectional diameter 216 of the remaining portion of the pin 208, as further illustrated in the cross-sectional view of the pin 208 in FIG. 4 (coil not shown). The enlarged portion 212 is preferably formed by swaging or pressing a portion of the pin 208 to deform that portion 212 of the pin 208 to possess a maximal cross-sectional diameter 214 greater than the cross-sectional diameter 216 of the undeformed portions of the pin 208. By swaging the pin 208, an enlarged portion 212 is created having bulged portions 218 and compressed portions 220. While the enlarged portion 212 of the pin 208 is illustrated as having two bulged sections 218, it is the intention of the inventor of the present invention that the enlarged portion 212 may be formed with any number of bulged sections, depending upon the machinery used to swage the enlarged portion 212 of the pin 208. The enlarged portion 212 may alternatively be formed simultaneously with the rest of the pin 208, such as in a molding process.

The maximal diameter 214 of the enlarged portion 212 is greater than an inner diameter of the coil spring 210. The coil spring 210 is stretched and positioned around the pin 208, where the larger diameter 214 of the enlarged portion 212 creates an interference fit with the smaller inner diameter of the coil spring 210. This interference fit between the components retains the coil spring 210 in a desired positional relationship with respect to the pin 208. The maximal diameter 214 of the enlarged portion 212 should be between approximately 2% to 20% greater than the inner diameter of the coil spring 210 in its unstretched resting state in order to provide a desired total interference between approximately 2% to 20%. The maximal diameter 214 of the enlarged portion 212 as well as the inner diameter of the coil spring 210 are selected to provide the desired degree of interference.

The coil spring 210 includes a plurality of windings 222 which are separated from each other by a spacing distance 224, otherwise known as the pitch of the coil 210. The enlarged section 212 will extend along a length 226 of the pin 208, where the length 226 of the enlarged section 212 should at least be as great as the spacing distance 224 between windings 222 of the coil spring 210. The length 226 of the enlarged section 212 and the spacing distance 224 between windings 222 may be variably selected to provide a desired amount of interference between the coil spring 210 and the pin 208. It should be noted that if the length 226 of the enlarged section 212 is made too large, it will be difficult to position the coil spring 210 onto the pin 208. To the contrary, if the length 226 of the enlarged section 212 is made too small, then a proper interference fit will not be established between the coil spring 210 and the pin 208.

The location of the enlarged portion 212 along the length of the pin 208 will dictate an amount of active coil the coil spring 210 possesses, where the active coil is the portion of the coil spring 210 between the enlarged portion 212 and the end 228 of the coil spring 210 which allows vibrational movement and flexibility of the coil spring 210. Since it is imperative to maintain a high degree of mechanical isolation between the header 206 and the vibratory rotation sensor 202, it is desirable to make the coil spring 210 as active as possible. The location of the enlarged portion 212 along the length of the pin 208 is selected to provide a desired amount of active coil and, in turn, amount of mechanical isolation. The end 228 of the coil spring 210 is then bonded to the electrical contact pad 204.

The present invention allows for precise control over the location of the section of the coil spring 210 which grips and makes electrical contact with the pin 208. This permits the compliance in the mechanical connection between the pin 208 and the electrical contact pad 204 on the vibratory rotation sensor 202 to be well controlled. Either or both of the coil spring 210 and the pin 208 may alternatively be metal plated, such as with gold, to enhance the electrical connection between the components. The electrical connection of the present invention provides a reliable, solderless electrical connection between a pin 208 and coil spring 210. Attempts at using solder to connect the components can result in poor control over the compliance of the connection, as it is difficult to control wicking of the solder between the coil spring 210 and the pin 208. Furthermore, attempts at winding the end of the coil spring 210 to a smaller diameter to grip the pin 208 requires the reduced diameter to be forced over the entire length of the pin 208, which can be difficult and time-consuming. The present invention provides a reliable electrical connection which is easily formed by simply stretching the coil spring 210 and positioning it over the enlarged portion 212 of the pin 208 to its desired arrangement.

Figure 5:
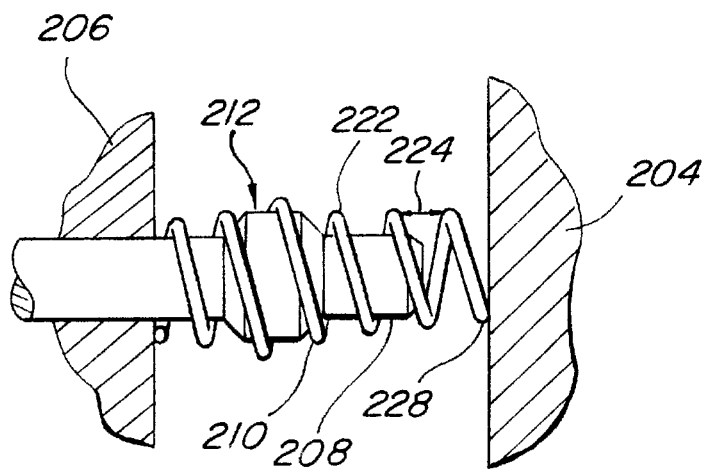
FIG. 5 is a partial cross-sectional side view of an electrical connection between a vibratory rotation sensor and a header assembly in accordance with another preferred embodiment of the present invention.

Referring now to FIG. 5, an enlarged view of another preferred embodiment of the electrical between the electrical pin 208 and coil spring 210 in accordance with the present invention is illustrated, where the enlarged portion 212 of the pin is formed as a cylindrical bulge having a cross-sectional diameter 214 greater than the cross-sectional diameter 216 of the remaining portions of the pin 208. In this embodiment, the pin 208 is preferably machined to form the enlarged portion 212 as a cylindrical bulge. The cylindrical bulge could also be formed as a collar which is slipped onto the pin 208 and affixed to the pin 208 in a desired position. Forming the enlarged portion 212 as a cylindrical bulge is preferred when the pin 208 is relatively short, since shorter pins 208 are not susceptible to the swaging technique of forming the enlarged portion 212 described in connection with the embodiment of FIG. 3. Other than forming the enlarged portion 212 as a cylindrical bulge instead of as a swaged section, the enlarged portion 212 of the pin 208 and the rest of the components of FIG. 5 function equivalently to their similarly numbered components described above in connection with FIGS. 3 and 4. Thus, a description of the features of the similarly numbered components will be omitted from this description of the embodiment of FIG. 5, since a description of these features can be found herein above.

Figure 6:
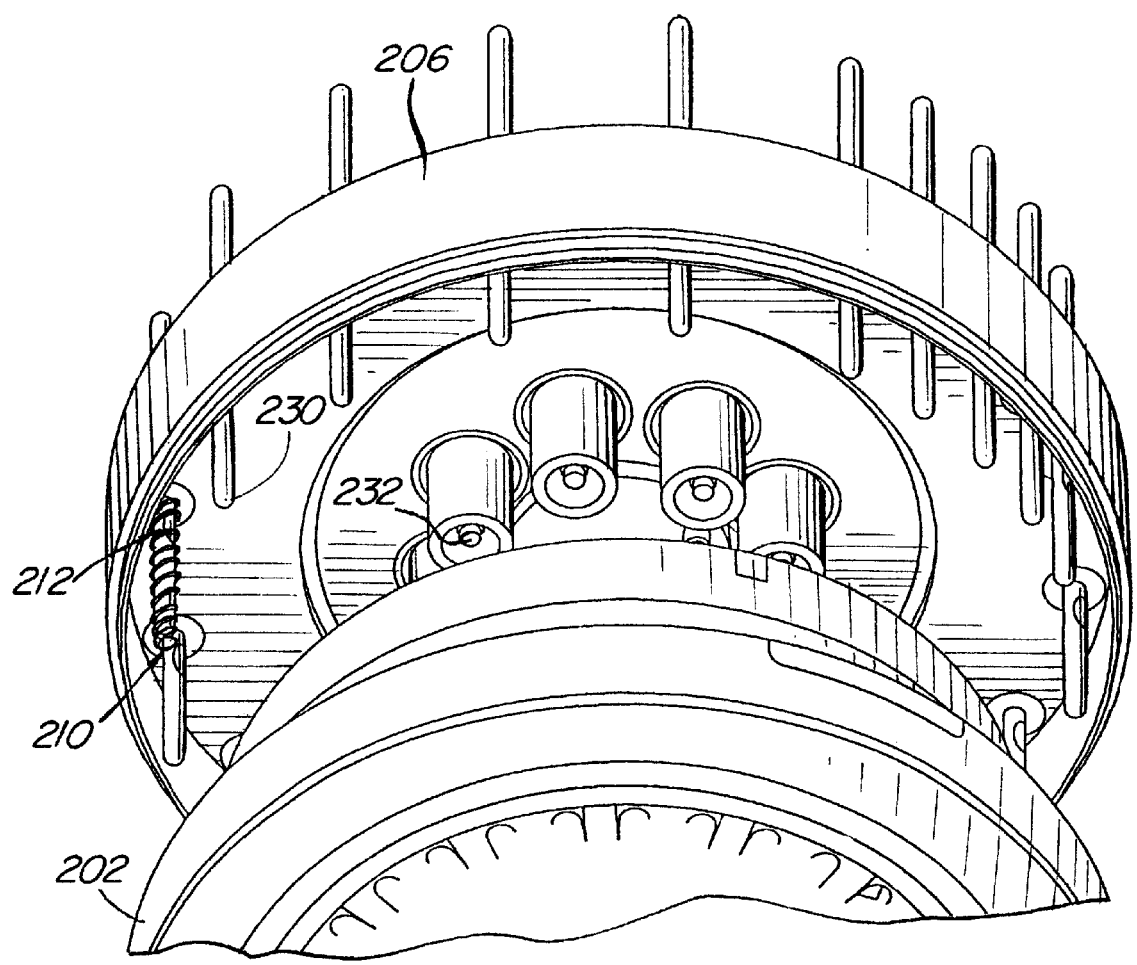
FIG. 6 is a perspective bottom view of an exploded vibratory rotation sensor and header assembly in accordance with a preferred embodiment of the present invention.

In order to provide the necessary readout information from the plurality of electrical contact pads 204 on the vibratory rotation sensor 202, the plurality of pins 208 provided in the hermetic header 206 are respectively connected to the electrical contact pads 204, as illustrated in the exploded view of FIG. 6. The pins 208 extend through the header 206 where they can be further connected electrically to another device to readout the signals received from the vibratory rotation sensor 202 or perform other signal processing. The pins 208 extending from the header 206 may possess an enlarged portion 212 formed in accordance with any of the embodiments of the present invention or any combination thereof. For instance, in the header 206 illustrated in FIG. 6, the outer pins 230 located closer to the outer periphery of the header 206 are longer and are formed with a swaged enlarged portion 212, while the inner pins 232 located closer to the center of the header 206 are shorter and are formed with a cylindrically-bulged enlarged portion 212. However, it is understood that the various pins 208 in the hermetic header 206 may be formed with an enlarged portion 212 which is either swaged or cylindrically-bulged.

As can be seen, the present invention provides a reliable electrical connection between a vibratory rotation sensor and a hermetic header which maintains a high degree of mechanical isolation between the connected components. Thus, the electrical connection of the present invention maintains the accuracy of the measurements of the vibratory rotation sensor by not hindering or restraining the vibrational movement of the vibratory rotation sensor. Furthermore, the electrical connection of the present invention allows the degree of mechanical isolation between the vibratory rotation sensor and the hermetic header to be precisely controlled through the relationship between the shape and positioning of the enlarged portion on the electrical pin and that of the coil spring.

In each of the above embodiments, the different structures of the electrical connection to a coil spring through a local interference fit are described separately in each of the embodiments. However, it is the full intention of the inventors of the present invention that the separate aspects of each embodiment described herein may be combined with the other embodiments described herein. Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An electrical connection for a hemispherical resonator gyroscope having a hermetic header assembly, the electrical connection comprising:

at least one pin extending from the header assembly; and a coil spring connected to said pin, wherein said coil spring extends from said pin to a respective electrical contact on the gyroscope to form an electrical connection between the header assembly and the gyroscope and said coil spring is positioned around at least a portion of said pin to form an interference fit with said pin.

2. The electrical connection of claim 1, wherein said pin includes an enlarged portion which provides the interference fit with said coil spring.

3. The electrical connection of claim 2, wherein said enlarged portion of said pin has a maximal cross-sectional diameter which is greater than an inner diameter of said coil spring in an unstretched state.

4. The electrical connection of claim 2, wherein said enlarged portion produces a total interference with said coil spring in the range of approximately 2 to 20 percent.

5. The electrical connection of claim 4, wherein said enlarged portion possesses a maximal diameter between approximately 2 to 20 percent greater than the inner diameter of said coil spring.

6. The electrical connection of claim 2, wherein said enlarged portion is formed by swaging a section of said pin.

7. The electrical connection of claim 2, wherein said enlarged portion comprises a cylindrical bulged section having a diameter greater than a diameter of a remaining portion of said pin.

8. The electrical connection of claim 2, wherein said coil spring includes a plurality of windings separated from one another by a predetermined distance, wherein said enlarged portion extends along a length of said pin at least as long as said distance between said windings of said coil spring.

9. The electrical connection of claim 2, wherein said length of said enlarged portion and said distance between windings in said coil spring are selected to provide a desired amount of interference between said coil spring and said pin.

10. The electrical connection of claim 1, wherein at least one of said at least one pin and said coil spring include a gold plating.

11. The electrical connection of claim 2, wherein said coil spring is stretched prior to being positioned over said enlarged portion on said pin.

12. The electrical connection of claim 2, wherein the location of said enlarged portion along a length of said pin is selected to provide a desired amount of mechanical separation between said header assembly and said gyroscope, wherein flexibility of the coil spring can be adjusted by the location of said enlarged portion.

13. The electrical connection of claim 1, wherein said coil spring maintains a high degree of mechanical separation between said header assembly and said gyroscope.

14. The electrical connection of claim 1, further comprising a plurality of pins extending from the header assembly which are respectively connected to a plurality of electrical contacts on said gyroscope through a plurality of respective coil springs.

15. An electrical connection to a hemispherical resonator gyroscope which provides a high degree of mechanical isolation comprising:
at least one pin extending from toward the gyroscope, where said at least one pin includes an enlarged portion; and
a coil spring connected to said enlarged portion of said pin,
wherein said coil spring extends from said pin to a respective electrical contact on the gyroscope to form an electrical connection between said at least one pin and the gyroscope and said coil spring is positioned around at least a portion of said enlarged portion of said pin to form an interference fit with said pin.

16. The electrical connection of claim 15, wherein said enlarged portion of said pin has a maximal cross-sectional diameter which is greater than an inner diameter of said coil spring.

17. The electrical connection of claim 15, wherein said enlarged portion produces a total interference with said coil spring in the range of approximately 2 to 20 percent.

18. The electrical connection of claim 17, wherein said enlarged portion possesses a maximal diameter between approximately 2 to 20 percent greater than the inner diameter of said coil spring.

19. The electrical connection of claim 15, wherein said enlarged portion is formed by swaging a section of said pin.

20. The electrical connection of claim 15, wherein said enlarged portion comprises a cylindrical bulged section having a diameter greater than a diameter of the remaining portion of said pin.

21. The electrical connection of claim 15, wherein said coil spring includes a plurality of windings separated from one another by a predetermined distance, wherein said enlarged portion extends along a length of said pin at least as long as said distance between said windings of said coil spring.

22. The electrical connection of claim 21, wherein said length of said enlarged portion and said distance between windings in said coil spring are selected to provide a desired amount of interference between said coil spring and said pin.

23. The electrical connection of claim 15, wherein at least one of said at least one pin and said coil spring are coated with a gold plating.

24. The electrical connection of claim 15, wherein said coil spring is stretched prior to being positioned over said enlarged portion of said pin.

25. The electrical connection of claim 15, wherein said coil spring maintains a high degree of mechanical separation between said pin and said gyroscope.

26. The electrical connection of claim 25, wherein the location of said enlarged portion along a length of said pin is selected to provide the desired amount of mechanical separation.

27. The electrical connection of claim 15, further comprising a plurality of pins extending from a header assembly which are respectively connected to a plurality of electrical contacts on said gyroscope through a plurality of respective coil springs.

28. A method of forming an electrical connection for a hemispherical resonator gyroscope which provides a high degree of mechanical isolation comprising the steps of:
forming an electrical contact pin having an enlarged portion, wherein said enlarged portion has a maximal cross-sectional width greater than the cross-sectional width of a remaining portion of said pin; and
positioning a coil spring around at least a portion of said enlarged portion of said pin to form an interference fit between said coil spring and said pin,
wherein said coil spring extends from said pin for attachment to a respective electrical contact on the gyroscope to form an electrical connection between said pin and the gyroscope.

29. The method of forming an electrical connection of claim 28, wherein said enlarged portion of said pin is formed to have a maximal cross-sectional width greater than an inner diameter of said coil spring in an unstretched state.

30. The method of forming an electrical connection of claim 29, wherein said enlarged portion produces a total interference with said coil spring in the range of approximately 2 to 20 percent.

31. The method of forming an electrical connection of claim 30, wherein said enlarged portion possesses a maximal cross-sectional width between approximately 2 to 20 percent greater than the inner diameter of said coil spring.

32. The method of forming an electrical connection of claim 28, wherein said enlarged portion is formed by swaging a section of said pin, wherein the maximal cross-sectional width of said swaged enlarged portion is greater than the cross-sectional width of the non-swaged portion of said pin.

33. The method of forming an electrical connection of claim 28, wherein said enlarged portion is formed by machining a portion of said pin to include a cylindrical bulged section having a diameter greater than a diameter of the remaining portions of said pin.

34. The method of forming an electrical connection of claim 28, wherein said coil spring includes a plurality of windings separated from one another by a predetermined distance, wherein said enlarged portion is formed to extend along a length of said pin at least as long as the distance between said windings of said coil spring.

35. The method of forming an electrical connection of claim 34, wherein said length of said enlarged portion and said distance between windings in said coil spring are selected to provide a desired amount of interference between said coil spring and said pin.

36. The method of forming an electrical connection of claim 28, further comprising the step of coating at least one of said pin and said coil spring with a gold plating.

37. The method of forming an electrical connection of claim 28, wherein said coil spring is stretched prior to being positioned over said enlarged portion on said pin.

38. The method of forming an electrical connection of claim 28, wherein the location of said enlarged portion along a length of said pin is selected to provide a desired amount of mechanical separation from said gyroscope.

\* \* \* \* \*